United States Patent

Glance

[11] Patent Number: 5,566,014
[45] Date of Patent: Oct. 15, 1996

[54] TUNABLE ADD/DROP OPTICAL FILTER PROVIDING ARBITRARY CHANNEL ARRANGEMENTS

[75] Inventor: Bernard Glance, Colts Neck, N.J.

[73] Assignee: AT&T Corp., Murray Hill, N.J.

[21] Appl. No.: 366,335

[22] Filed: Dec. 28, 1994

[51] Int. Cl.⁶ .......................................... H04J 14/02
[52] U.S. Cl. .................. 359/124; 359/128; 359/130
[58] Field of Search ........................... 359/124, 117, 359/127–128, 130; 385/24, 39

[56] References Cited

U.S. PATENT DOCUMENTS

| | | | |
|---|---|---|---|
| 5,136,671 | 8/1992 | Dragone | 385/46 |
| 5,339,157 | 8/1994 | Glance et al. | 385/24 |
| 5,367,586 | 11/1994 | Glance et al. | 359/130 |

OTHER PUBLICATIONS

Journal of Lightwave Technology, vol. II, No. 5/6, May/Jun. 1993 "A Precompetitive Consortium on Wide-Band All-Optical Networks".

IEEE Journal on Selected Areas in Communications, vol. 8, No. 6, Aug. 1990, "Acoustooptic Tunable Filters in Narrowband WDM Networks: System Issues and Network Applications".

*Primary Examiner*—Leo Boudreau
*Assistant Examiner*—Kinfe-Michael Negash

[57] ABSTRACT

A novel add/drop optical filter providing arbitrary channel arrangements between two input WDM signals and two output WDM signals is presented. The device consists of two WGR's connected by a plurality of 2×2 optical switches and 3 db coupling devices in each WGR branch. Through use of the inventive device, the second of the two input WDM signals can be added to the transmission path, while the second of the two output WDM signals is dropped. The added and dropped signals are of the same frequency, but can carry different information. The same circuit can also be used as a 2×2 wavelength-space switch for WDM signals. In both cases $N^2$ channel arrangements between the two outputs are possible when the two input signals each support N channels.

9 Claims, 7 Drawing Sheets

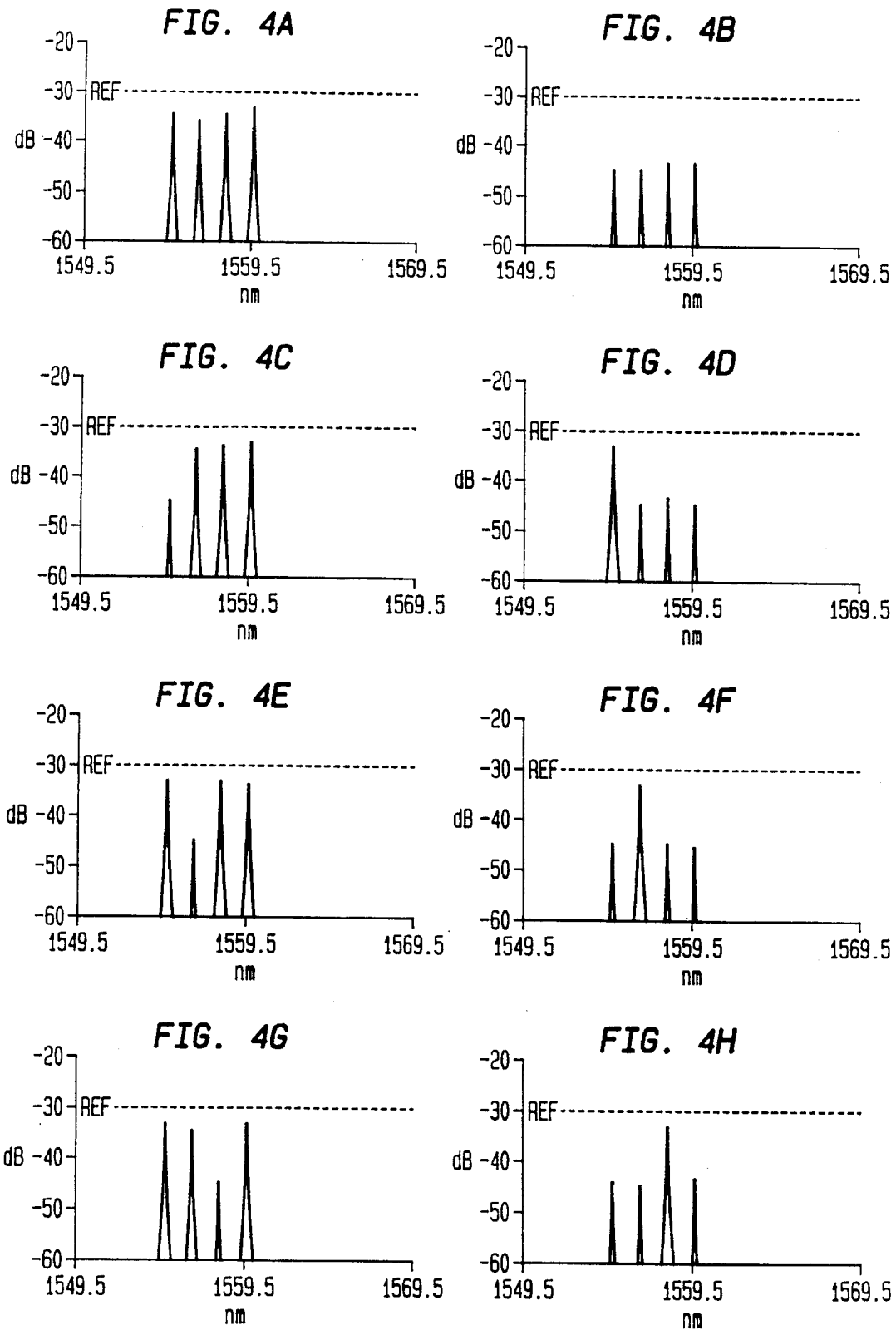

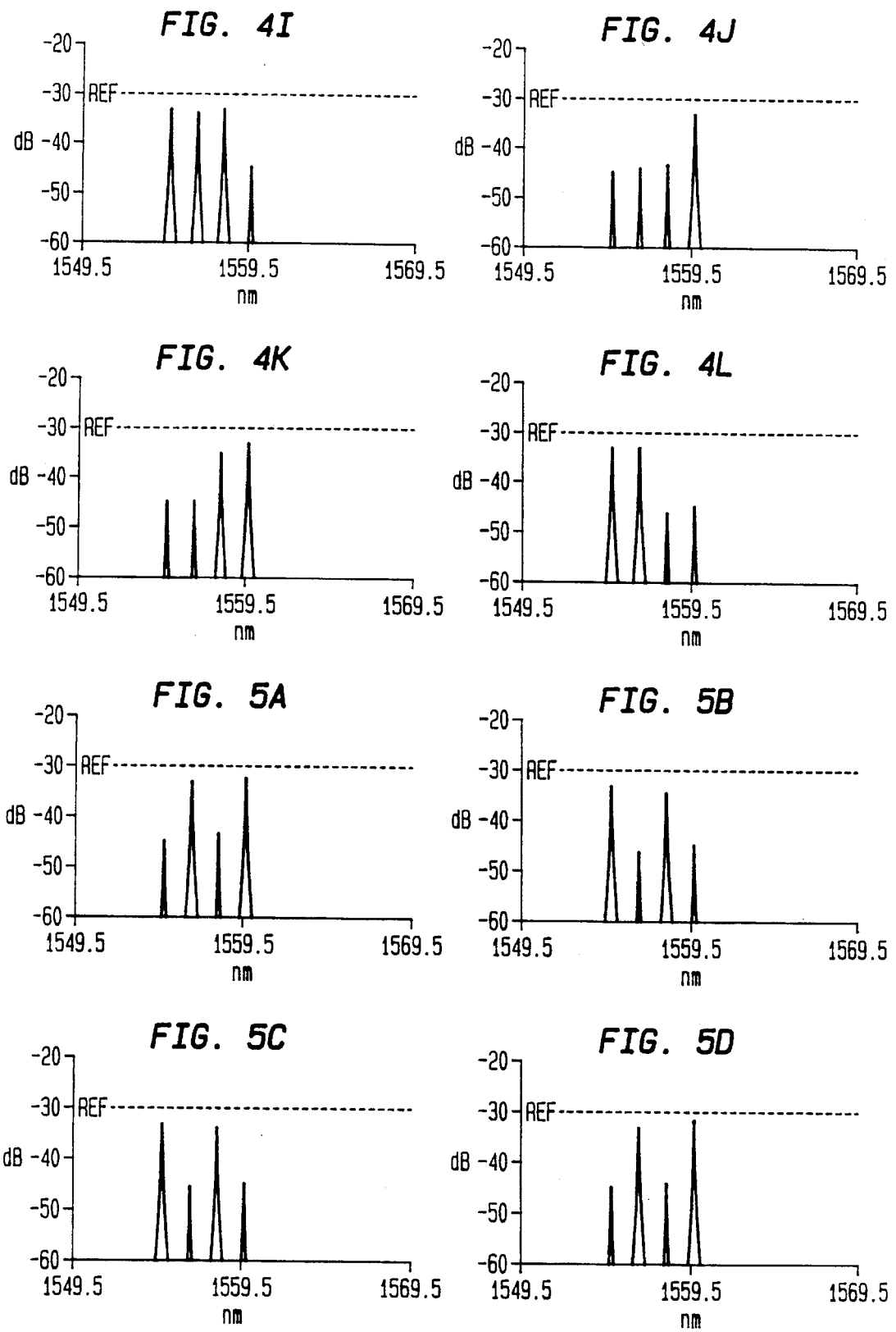

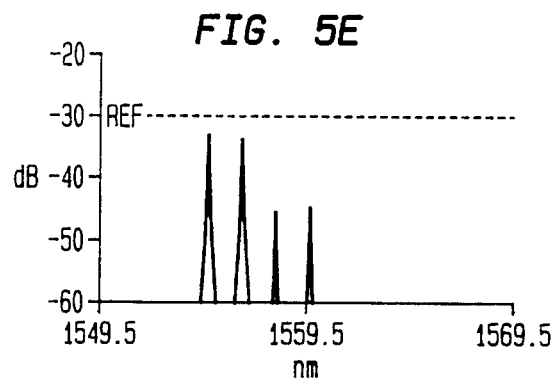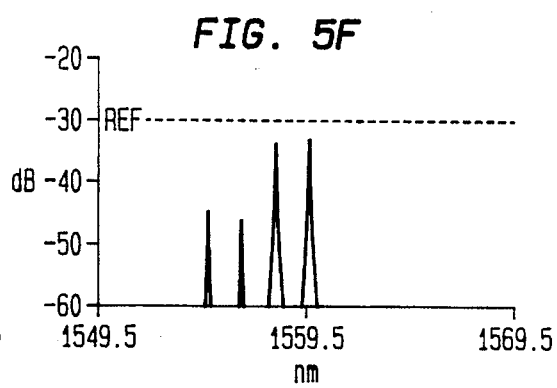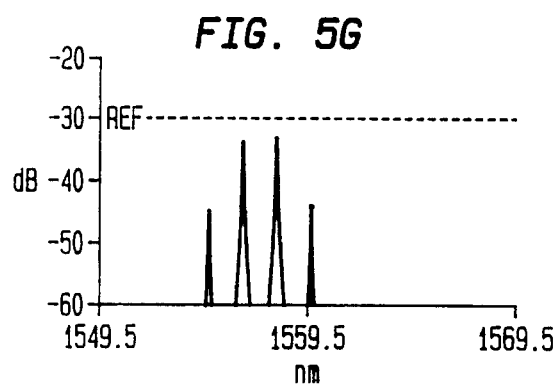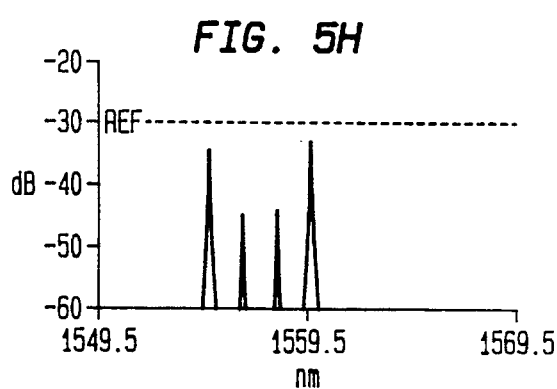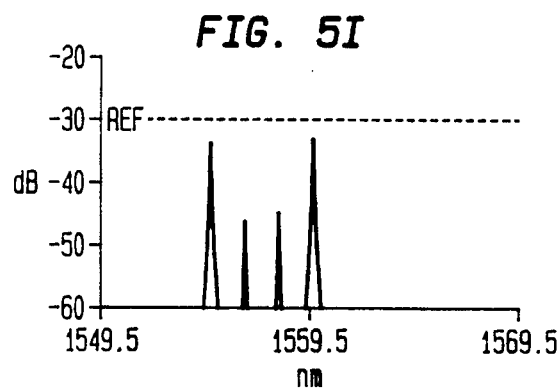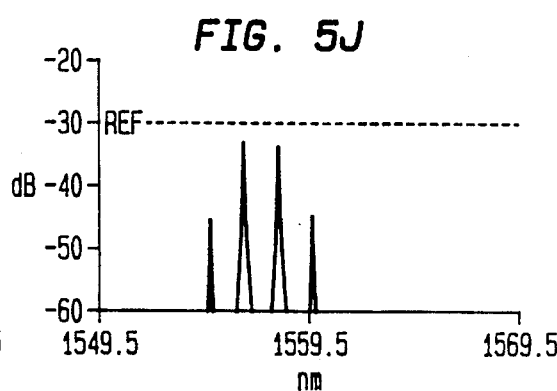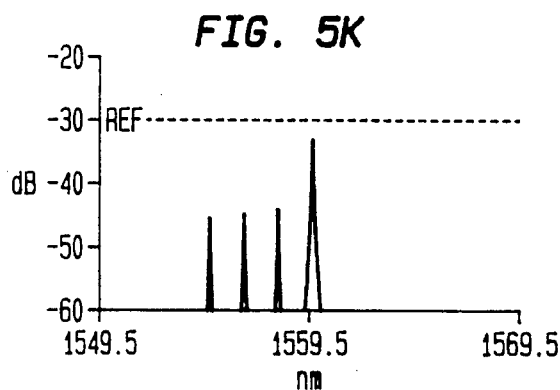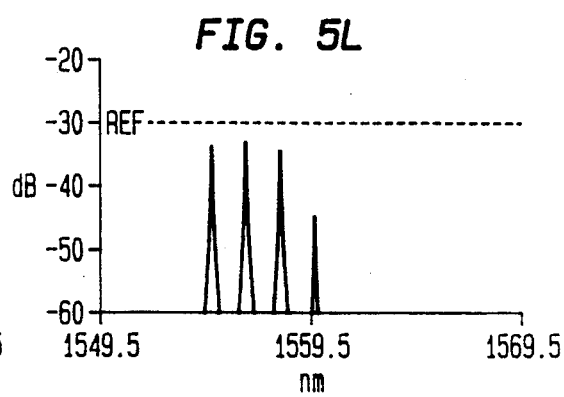

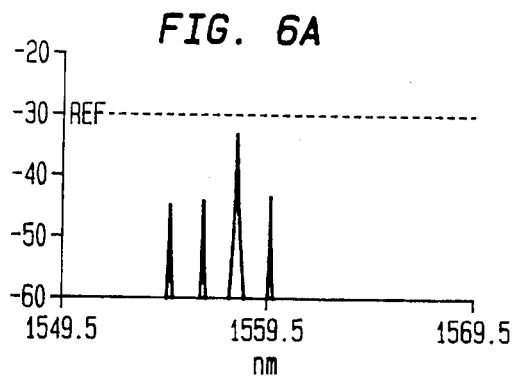
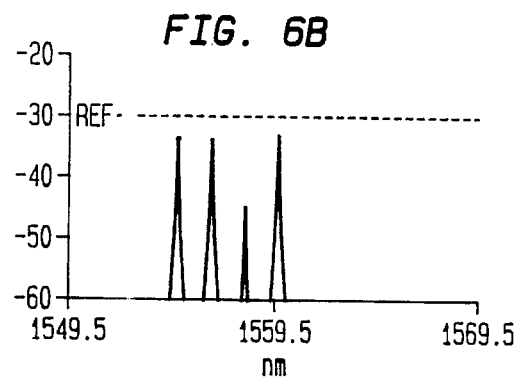
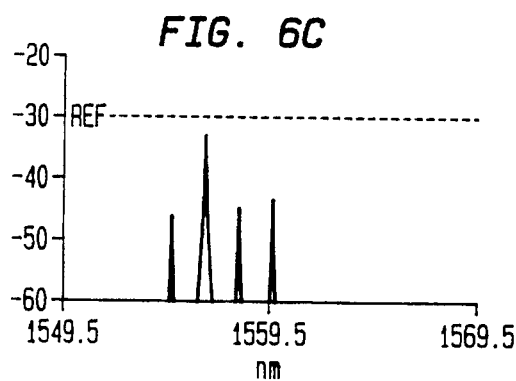
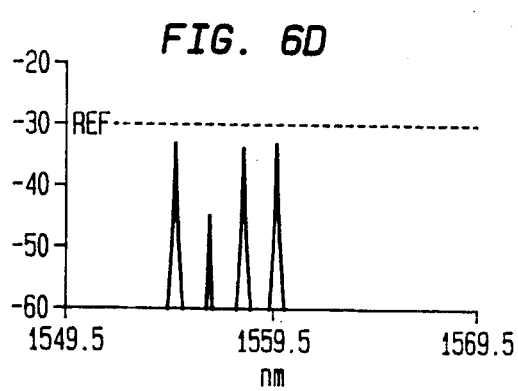
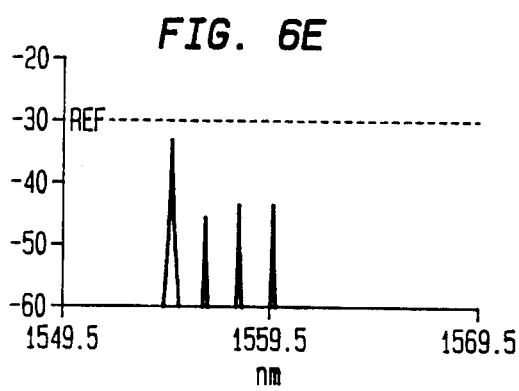
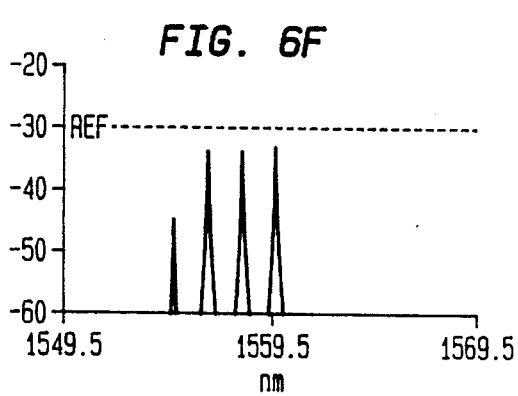
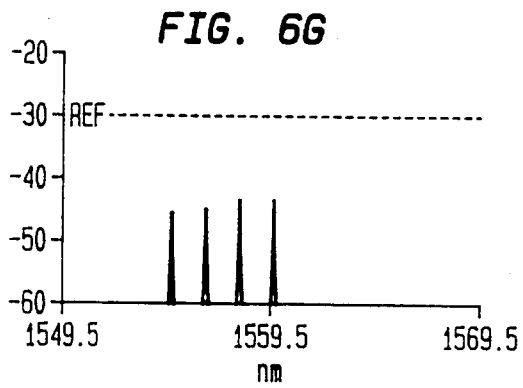
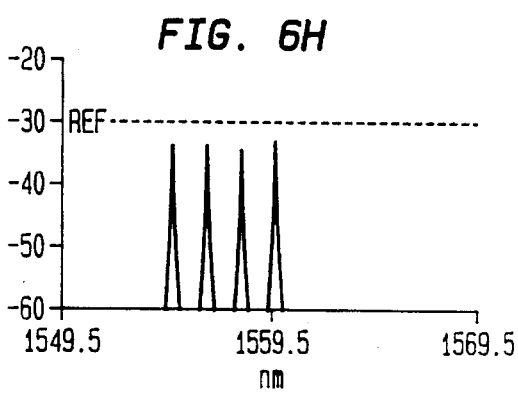

TUNABLE ADD/DROP OPTICAL FILTER PROVIDING ARBITRARY CHANNEL ARRANGEMENTS

FIELD OF THE INVENTION

This invention relates to optical interconnection devices and, more particularly, to a tunable add/drop optical filter which provides for arbitrary channel arrangements.

BACKGROUND OF THE INVENTION

Optical switching, multiplexing and demultiplexing, as well as the ability to add or drop signals at a specific wavelength, are critical components of a Wavelength Division Multiplexed (WDM) optical network. Such components are particularly necessary in an optical ring network, such as the networks described by A. F. Eliefaire in "Multiwavelength Survivable Ring Network Architecture" published in Globecom '89, Dallas, Tex., November 1989, and by A. F. Eliefaire et al in "Fiber-Amplifier Cascades With Gain Equalization in Multiwavelength Unidirectional Inter-Office Ring Networks," published in IEEE Photonics Tech. Letters, Vol. 5, No. 9, September, 1993. It should be noted that channels within a WDM signal may be distinguished by either their optical wavelength or optical frequency, and the terms frequency and wavelength will be interchangeably referred to for this purpose.

In particular, tunable add/drop optical filters are needed in WDM communication systems for selectively adding or dropping channels from WDM signals or needed in WDM cross-connects. Other known circuits have in the past attempted to provide this capability.

The first is an opto-acoustical filter, an example of which is described in an article by Kwok-Wai Cheung entitled "Acoustooptic Tunable Filters in Narrowband WDM Networks: System Issues and Network Applications" published in the IEEE Journal on Selected Areas in Communications, Vol. 8., No. 6, August 1990. Such filters are useful because of their broad, continuous electronic wavelength tunability and narrow filter bandwidth. Their multi-wavelength filtering capability also adds a dimension of flexibility to network design that heretofore could not be achieved with similar optical filters.

Another filter known to provide this add/drop capability is the conventional wavelength-space optical switch shown in FIG. 1, which will be described in detail hereinafter. Briefly, this device consists of two IXN demultiplexers which are connected to two 1×N multiplexers via a plurality of 2×2 optical switches. A desired frequency component may be added, and a signal of the same frequency may be dropped by proper connection of the 2×2 optical switches.

Accordingly, although tunable add/drop filters are known, all known circuits have inherent limitations which detract from the performance of a WDM optical network.

It is, therefore, an object of this invention to overcome such limitations and provide an improved add/drop optical filter with arbitrary channel arrangements by making use of the unique transmission properties of the Wavelength Grating Router (WGR).

SUMMARY OF THE INVENTION

The object of this invention is achieved by providing an input WGR to which is applied an incoming WDM signal comprised of N frequency components, and a signal, or signals, to be added (added signal) to the incoming WDM signal.

The input WGR reorders the frequency components of the WDM signal, and the added signal in accordance with the selected input ports of the WGR to which the WDM signal and the added signal are applied, and presents the reordered frequency components to output ports of the input WGR.

The reordered frequency components of the WDM signal and the added signal components are then applied through optical switches and coupling devices to input ports of an output WGR, which again reorders the frequency components in accordance with which input ports are utilized, and applies those components to selected output ports of the output WGR.

The result is an optical transmission device that provides a tunable add/drop optical filter that allows arbitrary channel arrangements, wherein selected incoming channels may be readily dropped, and other incoming channels may be readily added to the WDM signal stream.

It is to be understood that for each channel dropped, a channel of the same frequency may be added, with the added channel carrying different information then the dropped channel.

These, and other objects and features of the invention, will be more fully appreciated from the following detailed description when taken in conjunction with the accompanying drawings in which:

BRIEF DESCRIPTION OF THE DRAWINGS

In the drawings:

FIGS. 4–6 illustrate the outputs of the spectrum analyzers shown in FIG. 3.

DETAILED DESCRIPTION OF THE INVENTION

Figure 1:
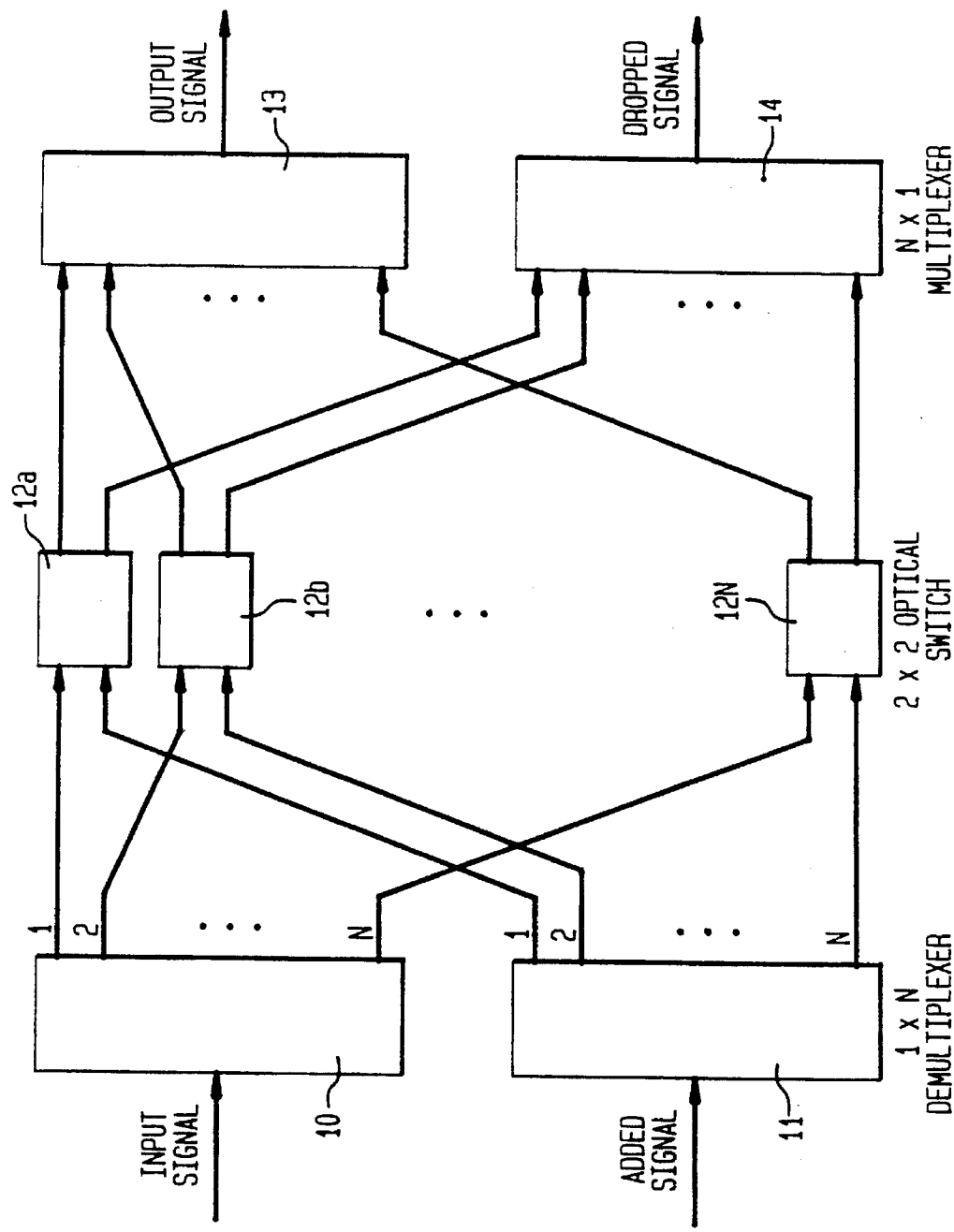
FIG. 1 illustrates a prior art add/drop optical filter.

Referring now to FIG. 1, there is shown a conventional wavelength-space optical switch. The switch consists of two 1×N demultiplexers 10 and 11 on the input side, with demultiplexer 10 operating to process an incoming WDM signal and demultiplexer 11 operating to process an added signal to be added to the incoming WDM signal. The output side consists of NX1 multiplexer 13, which operates to process the output signal and NX1 multiplexer 14, which operates to process a signal to be dropped from the incoming WDM signal.

Between the incoming demultiplexers 10 and 11, and the outgoing multiplexers 13 and 14, are arranged N 2×2 optical switches 12a–12N, which are conventional and well-known in this technology. Demultiplexer 10, demultiplexes the frequency components of the incoming WDN signal into N waveguide output ports. Similarly, the added signal is demultiplexed into N frequency components by demultiplexer 11, with the object being to drop one or more signals from the incoming WDM signal and to add one or more signals of the same frequeny to replace the dropped signal.

As is shown in FIG. 1, two demultiplexed signals 1 and 2 from demultiplexer 10 are applied to optical switches 12A and 12B. Similarly, two demultiplexed signals 1, 2 from demultiplexer 11 are also applied to optical switches 12A and 12B. Optical switches 12A and 12B then apply the two signals to be dropped to multiplexer 14, while the signals to be added are applied to multiplexer 13. Multiplexers 13 and 14 then remultiplex the remaining N-1 or N-2 frequency components into the fiber optic outputs for further transmission through the optical network.

The arrangement shown in FIG. 1 is further described in an article entitled "A Precompetitive Consortim on Wide-Band All-Optial Networks," by S. B. Alexander, B. Glance, et al, published in the Journal of Lightwave Technology, Vol. II, No. 5/6, May/June, 1993. Although this arrangement has certain advantages it requires multiple input multiplexers and multiple output demultiplexers which are not required with the instant invention.

Figure 2:
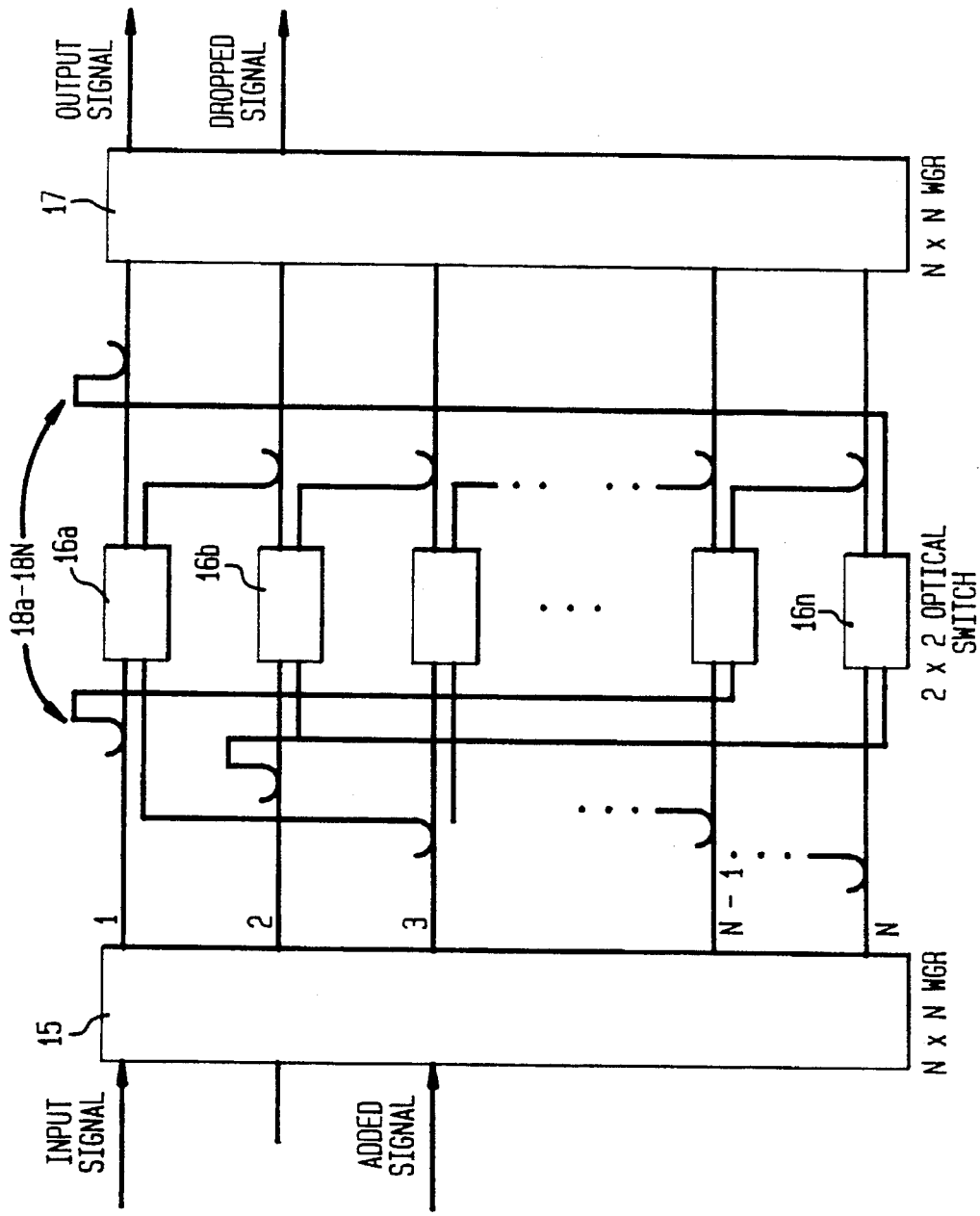
FIG. 2 illustrates an add/drop optical filter in accordance with the invention.

Referring now to FIG. 2, there is shown an improved device based on the unique frequency-selective transmission properties of the Wavelength Grating Router (WGR).

The properties of the WGR are set forth in U.S. Pat. No. 5,136,671, granted to C. Dragone on Aug. 4, 1982, and can be generally described as follows:

Assume that a WDM signal composed of N frequency components is applied to an NXN WGR. Each of the incoming frequency components will be demultiplexed by one of the output ports of the WGR. For clarity, assume that the numbers one, two, three–N are assigned to the output ports of the WGR, which demultiplex respectively the frequencies F1, F2, F3–N, when the incoming WDM signal is fed to the first input port of the WGR. Similarly, the output ports 1, 2, 3–N demultiplex the frequencies FN, F1, F2–FN-1 respectively when the incoming WDM signal is applied to the second input of the WGR. Accordingly, the frequency order of the demultiplexed components permutes (shuffles) by one unit each time the WDM incoming signal is fed to a successive input port. Consequently, the order in which the frequency components are demultiplexed among the N outputs depends on the input to which the WDM signal components are fed.

Based on this property, a wavelength tunable add/drop filter can be realized by adding a 1XN optical switch at each side of an add/drop filter made of two back-to-back N×N WGR devices. A channel wavelength to be dropped is selected by positioning the input switch to the appropriate input port of the first WGR. An output optical switch, positioned symmetrically, provides access to the output WDM signal. In this manner, a frequency component having the same wavelength as that of the dropped signal can be added to the output WDM signal.

In FIG. 2, there is shown the tunable add/drop optical filter of the instant invention, which provides arbitrary channel arrangements by making use of the WGR properties described above.

More particularly, the inventive filter consists of two WGR's 15 and 17 connected by 2×2 optical switches 16a, 16B–16N in each branch. The first WGR 15 demultiplexes the incoming WDM signal and the added channel signal fed respectively to the first and third input ports of WGR 15. It is to be understood that there are N-2 unused input ports for WGR 15. Thus, the channels of the incoming WDM signal are demultiplexed in the order of their wavelength by the 1st, 2nd ... Nth output ports of WGR 15. Similarly, the added channels are demultiplexed (with the same wavelength order) by the 3rd, 4th, ... Nth, 1st, 2nd output ports of WGR 15. The second WGR 17 is also used twice as a multiplexer. It multiplexes the output channels into its first output port and the dropped channels into its second output port. There are, of course, N-2 unused output ports for WGR 17.

The result is obtained by coupling through 3 dB couplers 18A–18N, the second input port of each optical switch 16a–16N to the second following branch (except for the last two couplers which are coupled to the first and second branches, respectively, see FIG. 2). Similarly, the second output port of each optical switch is coupled by a 3 dB coupler to the first following branch (except for the last one which is coupled to the first branch, see FIG. 2). With this arrangement, each optical switch is fed by two demultiplexed channels having the same wavelength. One originates from the input signal, the other comes from the added signal. According to the above circuit, one of the channels remains in the same branch, while the other channel is directed to the following branch. Consequently, the two channels are multiplexed in the first and second output ports of WGR 17 respectively, depending on the position of the 2×2 optical switches. Controlling the optical switches exchanges the two channels between the two branches. As a result, the two channels permute between the first and second output ports of WGR 17. Thus, same channel wavelength collision in a same output can never occur.

The same result is obtained independently for each pair of input and added channels. Thus, $N^2$ possible channel arrangements are possible between the two outputs of the filter when the device is fed by two WDM signals consisting each of N channels distributed along the same set of wavelengths.

Note that the circuit of FIG. 2 provides the same performance as that given by the conventional circuit shown in FIG. 1, but with half the number of demultiplexers and multiplexers. The result is achieved at a cost of 6 dB of additional loss. Of this 6 dB loss, 3 dB is due to the fraction of signal leaking through the unused port of the 3 dB couplers. The other 3 dB is caused by the fraction of signal directed to the unused ports of the multiplexing WGR components.

Figure 3:
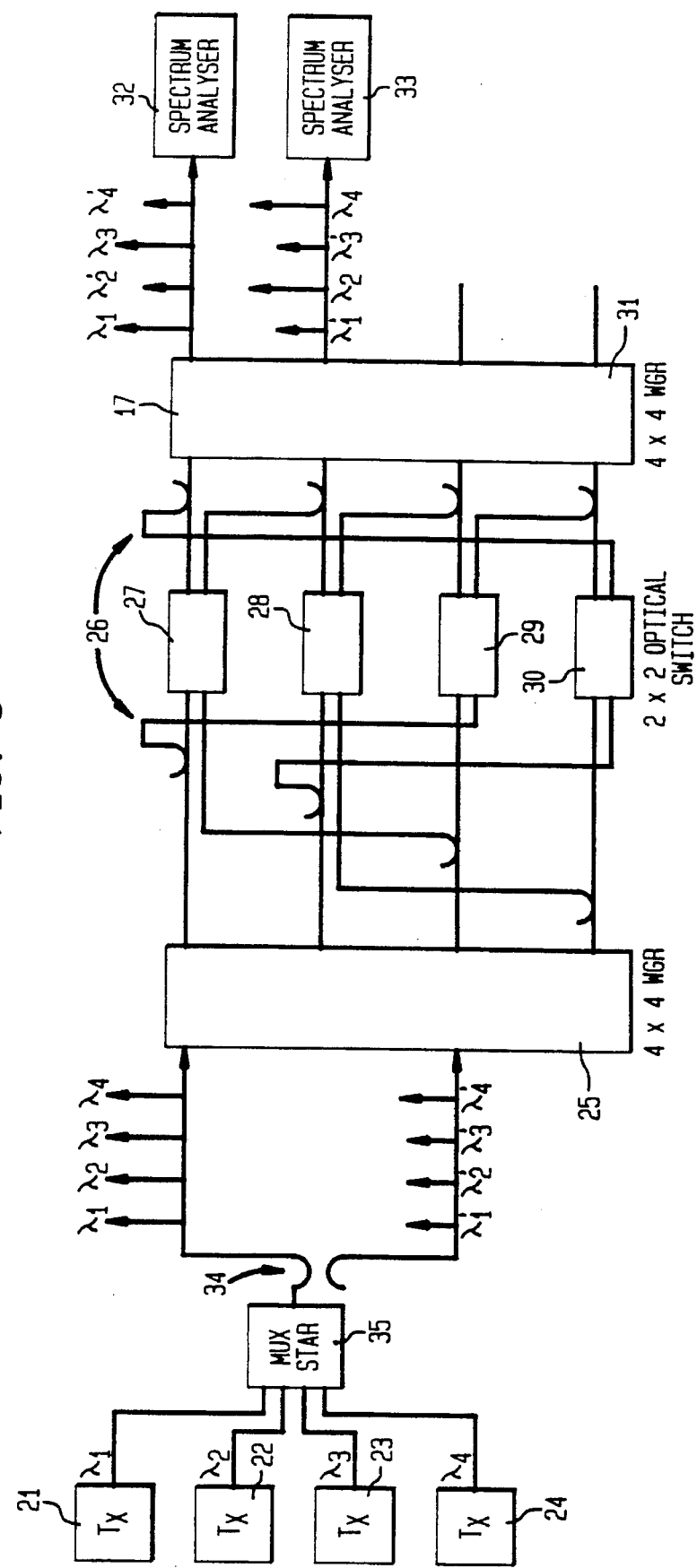
FIG. 3 illustrates one embodiment of the invention that shows an add/drop optical filter, which processes 4 separate frequency components of a simulated WDM signal.

Referring now to FIG. 3, there is shown a further embodiment of the instant invention. The system utilizes 2 4×4 WGR components 25 and 31, along with 4 Dicon 2×2 opto-mechanical switches, 27–30, capable of switching in 50 ms. Optical signals are supplied by four lasers 21–24 operating at wavelengths spaced by 1.6 nm around 1560 nm. These signals are, of course, intended to simulate an incoming WDM signal having four frequency components.

The four incoming frequency components are multiplexed by star coupler 35 and then divided into two signal paths by $\frac{1}{10}$ dB coupler 34. The stronger signal comprised of components λ1, λ2, λ3, and λ4, is meant to simulate the incoming WDM signal, while the weaker signal components λ1', λ2', λ3', and λ4' are meant to simulate signal components to be added to the incoming WDM signal.

This amplitude arrangement allows the determination on a spectrum analyzer of the origin of the channel distribution of the output WDM signal and the dropped signal. An added signal having the same number of channels as the input WDM signal allows one to also characterize the circuit in FIG. 3 as a wavelength-space switch between two input and output WDM signals.

It is, of course, to be understood that optical switches 27–30, as well as 3 dB couplers 26, operate in the same manner as described in FIG. 2 for optical switches 16a–16n and 3 dB couplers 18a–18N.

The output of WGR 31 provides both added and dropped signals. Applied to spectrum analyzer 32 is the WDM output signal consisting of original signals λ1, and λ3, along with added signals λ2', and λ4'. Similarly, the signals applied to spectrum analyzer 33 show that the signals λ1', λ2, λ3', and λ4, have been dropped from the WDM output signal.

FIGS. 4, 5 and 6 show the output of spectrum analyzers 32 and 33 for each of the 16 possible channel arrangements. The top spectrum of each pair of spectra corresponds to the output WDM signal, while the bottom spectra of each pair corresponds to that of the dropped signal. Below each pair of spectra is displayed the state of the four optical switches 27–30, shown in FIG. 3, each under its own wavelength.

The instant invention provides a simple tunable add/drop optical filter based on the known properties of the WGR. The same circuit can also be used as a 2×2 wavelength space switch for WDM signals. In both cases, $N^2$ channel arrangements between the two outputs are possible when the two input signals each support N channels.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

What is claimed is:

1. An optical transmission system for processing optical signals, each optical signal including N frequency components, the device comprising:

an input demultiplexing wavelength grating router having a plurality of first input ports, and a plurality of first output ports, means for applying a first optical signal including N frequency components to a first predetermined subset of said first input ports, means for applying a second optical signal, including N frequency components, to a second predetermined subset of said first input ports, means included within said input demultiplexing wavelength grating router for applying a first demultiplexed optical signal and a second demultiplexed optical signal to said first output ports in a manner dependent upon the subset of input ports to which said first optical signal, and said second optical signal, were applied, means for accepting said first and second demultiplexed optical signals from said first output ports, and for reordering said N frequency components of said first and second optical signals in a predetermined manner, output multiplexing means for receiving said N reordered frequency components of said first and second optical signals at first and second subsets of second input ports of said output multiplexing means, means included within said output multiplexing means for applying said reordered N frequency components of said first and second optical signals, to second output ports of said output multiplexing means, in a manner dependent upon the subset of second input ports to which said N frequency components of said first and second optical signals were applied.

2. An optical transmission device in accordance with claim 1, wherein said output multiplexing means comprises a wavelength grating router.

3. An optical transmission device in accordance with claim 2, wherein said accepting means includes N optical 2×2 switches, and N coupling devices for reordering said first and second demultiplexed optical signals and for applying selected N frequency components of said first and second optical signals to said output multiplexing means.

4. An optical transmission device for processing WDM optical signals, said optical signals including N frequency components, the device comprising, an input WGR having a plurality of input ports and a plurality of output ports, means for applying first and second WDM signals to first and second predetermined subsets of said input ports, means included within said input WGR for applying predetermined ones of said N frequency components of said first and second WDM signals to predetermined ones of said output ports, optical coupling means for accepting said predetermined ones of said N frequency components from said output ports, and for applying said predetermined frequency components to predetermined subsets of input ports of an output WGR, and means included within said output WGR for applying predetermined ones of said N frequency components of said first and second WDM signals, to predetermined ones of output ports of said output WGR.

5. An optical transmission device in accordance with claim 4, wherein said optical coupling means includes a plurality of 2×2 optical switches.

6. An optical transmission device in accordance with claim 5, wherein said optical coupling means includes a plurality of 3 db coupling devices.

7. An optical transmission device in accordance with claim 4, wherein said first WDM signal comprises an input signal and said second WDM signal includes a signal to be added to said WDM input signal.

8. An optical transmission device in accordance with claim 4, wherein said predetermined ones of said output ports of said output WGR include a first output port for carrying an output WDM signal and a second output port carrying a signal that has been dropped from said WDM input signal.

9. An optical transmission device in accordance with claim 7, wherein said WDM signal to be added is the same frequency as said WDM signal to be dropped, and is added to said WDM output signal.

\* \* \* \* \*